United States Patent Office 3,252,917
Patented May 24, 1966

3,252,917
METHOD OF PRODUCING ALUMINA-COATED SILICA IN SOL FORM
Morris Mindick, Chicago, and Arthur C. Thompson, Oak Lawn, Ill., assignors to Nalco Chemical Company, Chicago, Ill., a corporation of Delaware
No Drawing. Filed Aug. 27, 1962, Ser. No. 219,725
11 Claims. (Cl. 252—313)

The instant invention is concerned with a novel method of making alumina-coated silica sols through a simple, yet efficient, process.

More specifically, this invention relates to a method of coating alumina upon a core of silica which is in the form of an aqueous sol to produce a stable product sol thereof, having a pH of at least 4.5.

U.S. Patent 3,007,878 describes metal-coated silica particles existing as aquasols and a method of producing same. Among these sol products are alumina-coated silica sols. While these patented products and their method of preparation are an advance in the art, it has been subsequently determined that the patented process has certain inherent practical limitations. Specifically, using the starting sols of the subject process and following the techniques generally outlined therein, results in alumina-coated silica sols which are limited for purposes of stability, to existence only in a relatively strong-acid environment. When one employs an aqueous silica sol stabilized with an alkali metal hydroxide, which sol for convenience sake will be called an alkaline silica sol, and adds a source of the desired coating material thereto by simple mixing technique, the resultant alumina-coated silica sol is dependably stable only when the pH of the sol is kept relatively low, say about 4.5. The alumina-coated silica sols so produced then, are maintained in their true sol form only by means of a relatively corrosive environmental media. Attempts to raise the pH above the aforementioned range during the process or subsequent thereto have resulted in the production of completely unusable gelled products. It is evident then that the relatively high amount of electrolyte produced both from the use of the particular enumerated stabilized aqueous silica sols and as created in the coating reaction itself, has caused a situation wherein stability may be achieved only at relatively low pH's. A substantial increase in corrosivity results through use of such acid alumina-coated silica sols, since in the intermediate acid pH range of 2–6, a value of one or two pH units makes a distinct difference in the corrosive tendencies of a particular reagent used in various operations.

Commonly assigned copending application, Serial No. 62,268 filed October 12, 1960, now U.S. Patent 3,139,406, also describes a method of producing alumina-coated silica sols. Although eminently successful in producing sols having a wide range of alumina content, it requires that, after mixture of a trivalent acidic metal salt, such as aluminum chloride with a colloidal silica sol, the resultant product must be sequentially contacted with an anion exchanger and heated, each total sequence being carried out at least twice for a total of at least four separate process steps. The process is further subject to the complexity resulting from the fact that the spent resin must be removed prior to each heat treatment.

It would be a distinct advance in the art if alumina-coated silica sols could be produced having any desired amounts of alumina coated upon the silica particles, through a simple, yet efficient and economical, method whereby product sols are made which could remain stable in aqueous environment tending to approach a neutral situation, say between a pH 4.5 and 6.5. If prior art alumina-coated silica sols could be so produced and stabilized above a pH of about 4.5, they would find increased use in industrial areas having widely varying degrees of acidity, and yet these same alumina-coated silica sols would themselves, be substantially less corrosive when deposited in process systems to impart desired properties thereto.

If a system of preparing the above alumina-coated silica sol products having pH's above about 4.5 could be devised whereby only extremely small amounts of dissolved electrolyte were imparted into the system through reactant introduction or whereby any significant amounts of electrolyte so introduced are subsequently removed to produce a sol having an extremely low order of conductivity as a measure of dissolved electrolytic content, such a process would be useful in an industry continually striving to produce improved silica or combination metal-silica sol products. The improved physical characteristics of low electrolytic content, relatively long-term stability, and low corrosivity of the final products so created through such a method would be extremely advantageous characteristics in the desired coated silica sol.

Moreover, if such a method included the additional advantages of permitting variation of the alumina:silica ratio in the final product as well as the final solids content of the sol without encountering the ever-present problem of solid precipitation from the continuous aqueous phase or production of a thixotropic or completely insoluble gel material, such a process would have the necessary versatility for adaption to meeting any type of desired alumina-coated silica sol product specifications.

It, therefore, becomes an object of the invention to provide a method of producing stable, aqueous alumina-coated silica sols through a simple, economical process involving a minimum of process steps.

Another object of the invention is to provide a method of producing stable, substantially salt-free alumina-coated silica sols, which sols have a pH higher than 4.5, as measured in their aqueous sol state, and therefore, have a substantially decreased tendency to create corrosion problems when used as treating agents in various operations.

A specific object of the invention is to provide a method of producing stable, aqueous alumina-coated silica sols having a pH ranging from 4.5 to 6.5 whose alumina:silica ratio may be varied over a considerable range as well as the total solids content of said sols.

In accordance with the invention, a method has been discovered whereby stable alumina-coated silica sols having water as an aqueous phase may be produced, which sols remain substantially permanently stable at a higher non-corrosive pH than heretofore obtainable. In its broadest aspects the invention comprises the discovery of a method of reacting certain acid, substantially salt-free silica sols with basic aluminum halides, allowing the reactants to remain in contact for sufficient time to coat the desired amount of alumina upon the silica particles, and finally contacting the coated sol product in a single contact step or ion exchange resin pass with a water insoluble anion exchange resin which has as its exchangeable anion, an anion of a weak volatile inorganic acid, to produce a stable substantially salt-free alumina-coated silica sol having a pH ranging from 4.5 to 6.5. It is essential to the process in order to create the aforementioned process stable alumina-coated silica sol products, which also subsequently remain within the above pH range, that the starting aqueous silica sol product be substantially free of electrolyte, and that the alumina-coated product be finally treated with the above type anion exchange resin. Without these two process variants, the alumina-coated sol products cannot remain for any substantial length of time as true sols within the above stated pH range. The starting aqueous silica sol materials, the specific anion exchange resin, and the preferred method of making both will be discussed in more detail hereinafter.

The starting aqueous silica sols, which for convenience sake will be referred to as acid sols, are first simply mixed with a source of basic aluminum halides. The mode of addition of reagents is considered immaterial, although for convenience sake, it is usually preferable to add the acid silica sol to an agitated source of basic aluminum halide. Upon addition of the two reactants, an immediate clear sol results. No gelation or even minute amounts of precipitation material are noted.

After the two reactants have been contacted at room temperature for any period of time ranging from five minutes to two hours or more, the resultant clear sol may be heated to more firmly fix the alumina upon the silica particles. However, such heating step is not essential and numerous excellent alumina-coated silica sol samples have been prepared without resort to such heating expedient. If desired, heating may be effected at temperatures ranging from 100° F. to 212° °F. or about the boiling point of water, for periods of time ranging from five minutes to about three hours. Preferably the heating step is effected at temperatures ranging from 140° F. to about 200° F.

After the above has been carried out, the coated sols are then contacted once with an anion exchange resin, as defined above. This contact may be made by any of the well-known manipulative techniques in ion exchange technology, such as slurry of the resin with the coated silica sol or passing of the sol through a column of resin. The resin contact step has, in reality, a two-fold purpose. First, the resin contact removes a relatively high proportion of dissolved electrolytic salts which have resulted from reaction of the silica particles with the basic aluminum halide. Secondly, the resin contact raises the pH of the coated sol products above 4.5 and preferably within the range of 4.5 to 6.5. At this pH range, the coated silica sol products are considered less corrosive than similar prior art products heretofore discussed produced by prior art methods; in addition, the sols exhibit the long-term stability necessary for storage, shipping, and for use in many industrial operations. That is to say, the sol character of the products is retained even in this relatively non-corrosive environment, and no gelation or silica-alumina solid precipitation occurs. In addition, the products do not gradually increase in viscosity as do many prior art similar sols, with the latter frequently becoming so viscous that they are completely unable to be satisfactorily utilized.

After the product sols have been contacted with the anion exchange resin, the heating step may be repeated, to again more firmly fix the alumina upon the silica and also to stabilize more completely the aqueous products. This heating step may be carried out under the same conditions of temperature and time as discussed above.

It has been noted that through contact of the anion exchange resin, increased deposition of the alumina occurs as a result of consequent raising the pH. At the higher pH ranges, the basic aluminum halide has a tendency toward greater reactivity with the silica particles in addition to depositing a more uniform coating. While at acidities below about, say 4.5 it appears that much more free aluminum ionic species are formed which are not as available for deposition upon the silica as is the aluminum halide.

STARTING REACTANTS

The source of alumina as a starting material which has been defined as a basic aluminum halide is an aluminum halide which has been partly neutralized with a base or partially hydrolyzed. Sources of the above and methods of manufacture are shown in U.S. Patents 2,196,016; 2,915,475; 2,645,616 and 2,798,049. A preferred source of basic aluminum halide is the aluminum chlorhydroxy complex described in U.S. Patents 2,571,030 and 2,876,163. These aluminum chlorhydroxy complexes have a general empirical formula $(Al_2(OH)_5Cl)_x$, where $x$ is a lower integer ranging from 1 to 5. Of these the most preferred materials are those in which there is 1/6 or less equivalents of chloride per each equivalent of aluminum. These basic aluminum halides including the bromides, iodides and chlorides are supplied either as the pure material or as concentrated aqueous solutions. The amount of basic aluminum halide to be employed is calculated on the basis of alumina desired to be deposited upon the silica particles. Preferably, sufficient basic aluminum halide is added so that the alumina/silica ratio varies from 0.1 to 1.0 and more preferably from 0.1 to 0.6. It was noted that at extremely low ratios of alumina/silica, say about 0.05, instability resulted even using the acid, substantially salt-free starting sol materials and the process variant of contact with an anion exchanger.

The acid, stabilized silica sols, which go to make up one of the starting reactants are all aqueous salt-free sols which comprise an aqueous liquid having colloidally dispersed therein from 3 to 50% by weight of substantially discrete, dense, non-agglomerated particles of silica. More preferably, the silica-contents of the sols range from 3–30% by weight silica for purposes of the process and most preferably from 4–20% by weight.

These stable acid silica sols, which may be prepared by a preferred technique, hereinafter fully explained, all have pH's ranging from 2.6 to 3.8; preferably they have a pH in the range of 2.9 to 3.5. Their electrical conductivities are all less than 1000 micromhos/cm. at 77° F. The more preferred starting acid silica sols have conductivities ranging from 150–500 micromhos/cm. at 77° F. The silica particles themselves have surface areas ranging from 50–600 m.$^2$/g. One excellent method recently found for producing the acid, stable, aqueous silica sols useful as reactants with the basic aluminum halides is as follows:

This method includes the steps of contacting an alkali stabilized silica with an ion exchange system containing a hydrogen form strong acid cation exchange resin, allowing the thus treated sol to age under certain specific conditions, and subsequently again treating the aged sol with a hydrogen form strong acid cation resin. It is also essential that the sols be treated at least once with an anion exchange resin. The treatment with the anion exchange resin can take place either before or after the aging step. In a preferred embodiment, the pH of the sol is adjusted after the initial treatment with the ion exchange resin system.

The ion exchange resin system used in the first step of the process may be either:

A. A hydrogen form strong acid cation exchange resin.
B. A hydrogen form strong acid cation exchange resin in combination with a hydroxide form strongly basic anion exchange resin, or,
C. A hydrogen form, strong acid cation exchange resin in combination with a free base form weak base anion exchange resin.

In the first step, silica sols having an $SiO_2$ concentration ranging from between 3% to as much as 50%, are contacted with any one of the ion exchange resin systems described above. The exchange operation may be conducted as either a batch operation using a resin slurry, or in a preferred embodiment, as a column operation.

The second step of the process comprises the aging of the sols treated by the ion exchange resin system. The treated sols should age at least one hour at a temperature not greater than the boiling point thereof with a preferred aging step being conducted at a temperature range between 40° F. to 120° F. for at least four hours and most preferably between 16 and 24 hours.

While the aging process is most preferably conducted for the times and temperatures specified, it will be understood that aging periods of up to one week or more at temperatures as low as 34° F. may be employed. Also, where a rapid aging process is desirable, it is also possible to heat the sols at elevated temperatures, e.g., 120° F. to 180° F., thereby allowing the aging process to be completed in shortened periods of time ranging from one to about four hours.

In the third step of the process, the aged sols are again contacted with a hydrogen form strong acid cation exchange resin. As in the first deionization step, the resin system may be either A, B, or C listed above, with the proviso that the sols must be passed at least once through an anion exchange resin. The second deionization step may be suitably accomplished using either a slurry or column technique. If the sols are to be treated with both an anion and cation resin after the aging step, they may be contacted in any sequence, although the preferred sequence is to treat the sols initially with a cation exchange resin and then follow with the anion exchange resin. A further deionization technique involves the use of a mixed bed system which contains an intimate admixture of hydrogen form strong acid cation exchange resin and an anion exchange resin.

It is preferred that the anion exchange resin be a strong base resin which is capable of salt-splitting reactions and which also will remove weak acids such as carbonic and lower molecular weight silicic acids from the sols. It is also within the scope of the invention, however, to use a weak base anion exchange resin.

The anion and cation exchange resins can be used in series or in mixed bed. The strong acid cation exchange resins remove cations (predominantly Na). Strong base anion exchange resins remove all anion impurities including anions of weak acids.

There are several strong acid resins that are commercially available which can be used successfully in the subject process. One such product is sold under the trademarks Nalcite HCR and Dowex 50. This product is described in U.S. Patent 2,366,007. The resin is made by the nuclear sulfonation of styrene-divinyl benzene beads. Similarly, there are many strong base resins which can be used in the process. Examples of these materials include the commercially available Nalcite SBR, Dowex 1, Dowex 2, Dowex 11, and Dowex 21K. Nalcite SBR and Dowex 1 and 2 are described in U.S. Patent 2,591,573. Each of the above exchange resins has a quaternary ammonium type of exchange group. The quaternary ammonium anion exchange resins are highly ionized and can be used over the entire pH range. They are capable of salt-splitting reactions which convert a neutral salt to its corresponding base. A typical weak base anion exchange resin that can be used in the process is "Amberlite IR–4B" which is a modified phenol-formaldehyde polyamine condensate containing 14% nitrogen and 39.9% water in the basic form of the resin and having an exchange capacity of 10 milliequivalents per gram of resin. The properties of the resin are described by Kunin and Myers in the Journal of the American Chemical Society, volume 69, p. 2874, for 1947. Other anion exchangers are described in U.S. Patents 2,422,054 and 2,438,230.

The sols produced by treatment with the ion exchange resin system in the first process step are acidic to varying degrees depending upon the particular resin system employed. It has been observed that both the pH and viscosity of these sols will tend to increase somewhat in storage.

It is desirable that the aging process be conducted using sols which do not fluctuate in pH and which do not increase in viscosity. The aging process is most beneficially conducted upon sols having a pH within the range of from 1.5 to not more than 3.5 with a preferred pH ranging between 2.5 and 3.

When the hydrogen form strong acid cation exchange resin is used as the ion exchange resin system, the treated sol will have a pH of 2 or less. This low pH sol is admirably suited for the subsequent process steps of the invention. When the ion exchange resin system comprises a combination of a hydrogen form strong acid cation exchange resin in conjunction with either a hydroxide form strong or free base form weak base anion exchange resin, the pH of the resultant treated sol will range between 3 to about 5, depending upon the particular resin system employed and the degree of regeneration of the cation exchange resin.

Specifically, when an incompletely regenerated hydrogen form strong acid cation exchange resin is used in combination with a hydroxide form strong base anion exchange resin to treat the silica sols, the resultant pH will be approximately 5. Upon standing at room temperature, e.g., 72°±5° F., for one week, the pH of the treated sol will gradually approach 6. With increasing pH there will also be noted an increase in viscosity.

When a completely regenerated hydrogen form strong acid cation exchange resin is used in conjunction with a hydroxide form strong base anion exchange resin, the sols treated with such a system will have a finished pH of about 3, which upon storage for a period of one week at room temperature, will tend to increase to about 5.

The completely regenerated strong acid cation exchange resin referred to above is one which may be prepared by using, for example, 25 pounds of sulfuric acid per cubic foot at a regeneration flow rate of between 2 and 25 gallons per minute per square foot of resin area. While the completely regenerated resin yields a sol having the most desirable finished pH, the regeneration necessary to produce such a resin is not always commercially expedient.

An incompletely regenerated strong cation exchange resin is one produced using more conventional regenerative procedures, e.g., 10 pounds of sulfuric acid per cubic foot at the flow rates corresponding to those used in producing a completely regenerated resin.

An incompletely regenerated cation resin, when used in combination with a hydroxide form strong base anion exchange resin in a mixed bed unit is capable of producing a low pH sol, e.g., pH 3 which upon storage will increase in pH.

When a hydrogen form strong acid cation exchange resin is used in combination with a free base form weak base anion exchange resin, the finished sol treated with this system will have a pH ranging between 3 and 4. The use of the weak base resin represents the least preferred ion exchange resin system, inasmuch as it does not remove acids completely.

When using both strong acid cation and strong base anion exchange resins, care should be taken to have sufficient regeneration of the cation exchanger in order to prevent too high a pH occurring in the final effluent. At pH values above 6, and especially above 7, the viscosity increase which develops in the strong base resin column will necessitate the use of high pumping pressures.

Of the three ion exchange resin systems discussed above, a hydrogen form strong acid cation exchange resin in combination with a hydroxide form strong base anion exchange resin is most desirable. This combination system is beneficial in removing weakly acidic materials such as carbonic and silicic acids, thereby adding to the stability and purity of the finished product.

Regardless of the starting ion exchange resin system used, the pH of the treated sols tends to increase. This increase in pH may be hypothesized as resulting from alkali metal ions which were initially occluded within the silica particles. Under acid conditions these alkali metal ions are removed from their associated state with the silica particles, and translocate into the aqueous phase of the sols. This migration of the alkali metal into the aqueous phase of the sol occurs during the aging step. The translocation of the alkali metal into the aqueous phase of the sols is further promoted by maintaining the sols under buffered acidic pH conditions. For this reason the pH of the sols during the aging process are desirably maintained at a pH between 1.5 and 3.5, and preferably between 2.5 and 3 by adding to the sols after treatment with the starting ion exchange resin system a water soluble low molecular weight acidic material, such as hydrochloric acid, acetic acid, sulfuric acid, phosphoric acid, and the like.

When using both cation and anion resins, addition of minor amounts of acid between the deionization steps can be accomplished by any one of several methods. In one such method the sol, after passage through the cation resin, is passed through an anion resin bed which leaks acid. By this means, it is possible to incorporate the acid in the sol without requiring a separate step. Another method is to bypass a portion of the cation bed effluent into the anion resin effluent. In the more usual process, the acid is added to the aging tank after all the sol has passed through both columns.

The aging step, either alone or in conjunction with acidification of the ion exchange resin system treated sols, in promoting the migration of cations into the aqueous phase of the sols, allows the final deionization step of the invention to completely remove all vestiges of ionic components present thereby producing an ion free acidic sol of high purity and stability. When the aging process is conducted as indicated there is no change in the physical form of the silica particles, nor is there any increase in the viscosity of the final sol. These stable sols show little or no change in pH under conditions of long-term storage, as evidenced by elevated storage tests conducted at 120° F., for one month and for 20 weeks. The sols produced by this process have the same silica content, e.g., 3–50% as the starting sols.

The following example will serve to illustrate the method of making the starting aqueous silica sols. The conductance measurement, abbreviated to mmhos, is the specific conductance in micromhos/cm. at 77° F.

*Example I*

A two-drum (110 gallon) quantity of a commercially available 35% silica sol was deionized by passing the sol throuh a six inch diameter column containing 25 inches of a strong base anion exchange resin at the bottom of the column, and 25 inches of a strong acid cation exchange resin. The strong base anion exchange resin used is known as "Nalcite SBR" which is described in U.S. Patent 2,591,573. The strong acid cation exchange resin used, is the commercially available product "Nalcite HCR" which is described in U.S. Patent 2,366,007. The deionization of the sol was carried out at a flow rate of 0.75 g.p.m. (gallons per minute) which is equivalent to 5 g.p.m./ft.$^2$. A composite of the effluent from the column produced a product having a pH of 2.1 and a conductance of 650 mmhos. The low pH indicated that some acid leakage had occurred through the anion bed. After standing overnight, the material again was passed through the ion exchange unit. The composite of this material gave a pH of 3.10 and a conductance of 395 mmhos. This product is believed to be almost permanently stable.

One of the accepted theories of colloidal chemistry is that the gelation of silica sols is caused by the condensation of silanol groups on the surface of the particles which forms siloxane linkages. The fewer collisions between the individual particles, the less likely it is that that silanol groups of different particles will react to form siloxane groups. The particles tend to remain apart because of the negative charge on their surface. It is known that OH ions in the solution catalyze the condensation of silanol groups. It is also known that neutral salts which are present in the solution reduce the repulsive force exerted by the charged particles. One of the distinct advantages of the above process is that substantial amounts of neutral salts are not formed during the stabilization step.

As was pointed out above, it is likely that the increase in pH of the deionized sol is due to the presence of occluded sodium ions. Viscosity studies have shown that there is an occluded volume of about 5% in the sol particle. By allowing the product to stand for at least four hours and preferably for at least 14 hours, the bulk of the sodium ions diffuse out into the liquid where the second deionization will remove them. It has been found that this double ion exchange treatment produces a product containing insufficient residual sodium to increase the pH of the sol above about 3.2.

It would, of course, be possible to pass the sol more than twice through the deionization bed. Such a procedure, however, would be impractical from a commercial standpoint and would not increase the stability of the sol to any substantial extent.

Under certain conditions, it has been found to be desirable to add minor amounts of an acidic material after the second deionization step. These acidic materials may be selected from low melocular weight acids such as hydrochloric, sulfuric, acetic and phosphoric with the latter two being the preferred members of this class. The amount added usually will not be more than 50 parts per million, and preferably 10–30 parts per million. These acids tends to neutralize any metallic corrosion products or traces of alkalinity leached from drum or tank coatings during the storage and transportation of the sols.

The following table sets forth starting alkaline sols which exemplify the materials which can be treated by the above process to produce the starting acid silica sols of the invention.

| | Nalcoag 1015 | Nalcoag 1030 | Nalcoag 1035 | Nalcoag 1050 |
|---|---|---|---|---|
| Percent Colloidal Silica as SiO$_2$ | 15 | 30 | 35–36 | 49–50 |
| pH | 8.6 | 10.2 | 8.6 | 9.0 |
| Viscosity at 77° F. cps | (¹) | (¹) | (¹) | (²) |
| Specific Gravity at 68° F | 1.09 | 1.205 | 1.255 | 1.385 |
| Average surface area M$^2$/gram of SiO$_2$ | 330–430 | 190–270 | 135–190 | 120–150 |
| Average particle size, millimicrons | 7–9 | 11–16 | 16–22 | 20–25 |
| Density lbs./gallon at 68° F | 9.1 | 10.0 | 10.5 | 11.6 |
| Freezing point, ° F | 32 | 32 | 32 | 32 |
| Na$_2$O, percent | 0.04 | 0.40 | 0.10 | 0.3 |

¹ Less than 5.
² Less than 30.

The holding period between the deionization steps can range from one hour up to as long as one week or more. Our preferred holding period is from 14 to about 48 hours, and our most preferred holding period is from 16 to 24 hours.

It is understood, of course, that the invention is not limited to the starting acid, stable silico sol materials solely produced by the above process, but any acid silica sols within the definition of the starting materials may be employed for use as a reactant with the basic aluminum halide.

ANION EXCHANGE MATERIAL

As mentioned above, the alumina-coated silica sol obtained after the coating reaction is considered complete, is then contacted in a single economical and efficient step with a water insoluble anion exchange resin which has as its exchangeable anion, an anion of a weak volatile inorganic acid. In a preferred embodiment, the product sol effluent from the above anion exchanger is then heated to more firmly fix the coating upon the silica particles. In addition, such heating also removes from the produced sol the excess volatile gas contained therein.

While any anion exchanger may be used that is capable of being treated whereby its exchangeable positions contain the anions of weak volatile inorganic acids, it is preferred to use what are now well-known to the art as strongly basic anion exchangers. These exchangers or resins have recently been used in numerous applications and perhaps their most unique characteristic is their ability to "split salts" from aqueous media. By the expression "split salts" is meant that the resins are capable of exchanging various anions directly for other anions without first being converted into the hydroxide form. This salt splitting ability of the strongly basic anion resins is attributed to the quaternary ammonium groups which these resins possess and is not normally possessed by the weakly baic anion exchange resins.

Examples of strongly basic anion exchange resins which can be employed in the practice of the invention are those described in U.S. Patents 2,591,573; 2,597,440; 2,597,494; 2,614,099; 2,630,427; 2,632,001 and 2,632,000. Examples of weakly basic anion exchange resins which can be employed are those described in U.S. Patents 2,582,098; 2,597,439 and 2,597,491.

The strongly basic insoluble anion exchange resins which are preferably employed for the purpose of the invention are reaction products of a tertiary amine and a vinyl aromatic resin having halo methyl groups attached to the aromatic nuclei in the resin. Another class of anion exchange resins suitable for the practice of the invention are the reaction products of the tertiary carbocyclic or heterocyclic amines and vinyl aromatic resins having halo methyl groups attached to the aromatic nuclei in the resin. The vinyl aromatic resins employed as starting materials in making the anion resins employed in the preferred practice of the invention are normally solid benzene insoluble copolymers of a monovinyl aromatic compound and a polyvinyl aromatic compound and a polyvinyl aromatic compound containing from 0.5 to 40% by weight, preferably from 0.5 to 20% by weight of the polyvinyl aromatic compounds chemically combined. Examples of suitable monovinyl aromatic compounds are styrene, alpha methyl styrene, chlorostyrenes, vinyl toluene, vinyl naphthalene and homologues thereof, capable of polymerizing as disclosed, for example, in U.S. Patent 2,614,099. Examples of suitable polyvinyl aromatic compounds are divinyl benzene, divinyl toluene, divinyl xylene, divinyl naphthalene, and divinylethyl benzene. These resins are halo methylated as described, for instance, in U.S. Patent 2,614,099 preferably to introduce an average of 0.2 to 1.5 halomethyl groups per aromatic nucleus in the copolymer and then reacted with a tertiary amine to introduce a quaternary ammonium anion exchange group. Examples of suitable tertiary amines are trimethylamine, triethylamine, tributylamine, dimethylpropanolamine, dimethylamine, 1-methylamine, dioctyl ethanolamine, and homologues thereof. The prefered tertiary amines can be described as mono- and dialkyl N-substituted alkanol and alkane diol amines. A suitable anion exchange resin of the type described above is available as "Nalcite SAR" or "Nalcite SBR."

The weakly basic resins are prepared in a similar manner except that primary and secondary amines are reacted with the haloalkylated resin. Examples of such amines are methylaniline, dimethylamine, n-butyl amine, dibutyl amine, isobutylamine, aniline, benzidines, toluidines, xylidines, alpha and beta naphthalenediamine, benzylamine, dibenzylamine, ethylenediamine, cyclohexylamine, diethylenetriamine, triethylenetetramine, tetraethylenepentamine, propylenediamine, dipropylenetriamine, and homologues thereof. The anion exchange resins can also be prepared by halogenating the molecule of the resin and then introducing an anion exchange group as described in U.S. Patent 2,632,000.

The volatile weak inorganic acids, or more specifically the anions thereof, that are preferably used are the bicarbonate and carbonate. The sulfide, cyanide and nitrite can also be used. Of course, due to the inherent disadvantages in using the acids or salts containing the sulfide or cyanide radical, these are less desirable for most practical purposes. The water soluble alkali metal carbonates and bicarbonates are admirably suited for treating strongly basic anion exchange resins to place the resin in a form appropriate for subsequent treatment with a dilute solution of the appropriate metal halide. Excellent results had been achieved by using solutions of sodium bicarbonate. Although the water soluble alkali metal salts of these particular classes of anions are preferably used, it is apparent that other methods may be used to regenerate the resins prior to their employment in the practice of the invention. For instance, if a weak anion exchange resin is used, it can be converted to the hydroxide form and the latter then treated in an aqueous solution into which carbon dioxide gas is being bubbled. Under proper conditions of pH and chemical equilibrium, a certain amount of resin will be placed in the carbonate form and it can be then used for performing the operations of which several are subsequently described.

The alumina-coated silica contacted with an anion exchanger having in its exchangeable positions the anion of a weak volatile inorganic acid, often contains amounts of dissolved or dispersed gas such as carbon dioxide or hydrogen sulfide which is preferably removed from the sol to render it more stable as well as to provide a finished product having greater purity. The gas is preferably expelled by heating under conditions as defined above. It may also be removed by any of the well-known methods now available for removing dissolved or dispersed gases from liquid media. If carbon dioxide is the produced gas, it has been found that when the temperature of the produced sol is elevated to about its boiling point, the majority of the dissolved gas readily volatilizes into the atmosphere leaving behind a sol of extremely high purity, If the volatile gases contained in the sol are obnoxious or dangerous, such as hydrogen sulfide or cyanic acid, extreme caution should be used in removing the gas lest harm be inflicted upon the operator of the process.

By using the above aforementioned process techniques, stable aqueous sols may be produced in which alumina is coated upon the silica particles. These sols have an alumina/silica ratio ranging from 0.1 to 1.0 and more preferably from 0.1 to 0.6. The total solids content of these sols, that is, including both alumina and silica content, ranges from 5 to 40% by weight of the total sol. Very stable and useful products having a total solids content within the range of 15–30% by weight are easily produced. Again, the finished alumina metal coated silica sols have a pH range of from between 4.5 and 6.5, with the preferred pH range being within the range of between 5.0 and 6.0. This latter pH range is extremely desirable for a stable useful alumina sol which shows little or no tendency to corrode in any particular medium to be treated. The alumina-coated silica sols are also relatively free from electrolytes and other ionic components. They may be said to be salt free. The finished sols will, in all instances, have conductivities ranging from 1000–5000 micromhos. Moreover, these alumina sols are relatively non-viscous liquids, which may be handled without the need of using special mixing equipment or agitational devices to render them fluid, as the case in the conventional thixotropic sols of the prior art.

To illustrate the preparation of several alumina-coated silica sols, by using the general preparative techniques described above, the following examples are presented. In each example, the term "resin" is used to designate the ion exchange resin sold as "Nalcite SAR," in its bicarbonate form. Wherever conductance values are given they indicate specific conductance and are expressed in terms of numerical values only. These conductance values in each instance indicate micromhos/ centimeter at 77° F.

*Example II*

243 ml. of the salt-free acid silica sol of Example I were added to 64 ml. of a 50% solution of $Al_2(OH)_5Cl$. A viscous clear sol resulted having a pH of 3.5. This sol was then heated slowly to a peak temperature of 180° F., over a period of one hour. The contact with the anionic resin exchanger was then effected after 50 ml. of water were added. A total of 98 grams of resin was added to the sol over a period of ½ hour. The final alumina-coated silica sol product had a density of 1.135, a pH of 5.5, a specific conductance of 3200, a solids concentration of 19% and a $Al_2O_3/SiO_2$ ratio of 0.2.

*Example III*

275 ml. of the acid sol of Example I were added to 64 ml. of the basic aluminum chloride of Example II (50% by weight) and the resultant sol was then diluted to 500 ml. The pH at this time was 3.0 and the specific conductance was 12,800. The temperature of the sol was raised to 180° F. and held at this temperature for one hour. After this heating step was completed, the pH was 2.8 and conductance was 22,500 micromhos/cm. Lastly, the sol was contacted with resin via a column technique whereupon a finished sol having a pH of 5.2 and specific conductivity of 2600 was produced. The alumina/silica ratio was 0.17 and percent solids was 23%.

*Example IV*

The alumina-coated silica sol of this experiment was prepared in the same manner as outlined in Example III with the exception that no heating was applied. The final sol product had a pH of 5.5 and conductance of 2600.

*Example V*

A portion of the final alumina-coated silica sol of Example IV was heated for an hour at 180° F. The cooled sol had a pH of 5.3 and a specific conductance of 2450.

*Example VI*

This example illustrates the critical necessity of contacting the formed alumina-coated silica sol with an anion exchange resin in order to stabilize the resultant product. 275 ml. of the acid stabilized silica sol of Example I were added to 65 ml. of the basic aluminum chloride of Example II and the resultant sol was diluted to 500 ml. This sol contained 23.5% solids and had an alumina/silica ratio of 0.17 and a specific gravity of 1.18. The sol was then heated for three hours at 180° F. Upon standing over a period of two days, the sol gelled. Another sol similarly prepared which had a solids content of 30%, gelled upon cooling. This latter sol even when diluted to a solids concentration of 11.8%, also gelled upon standing.

*Example VII*

This example illustrates that even relatively large amounts of alumina may be coated on the silica particles without gelation if the practices of the invention are followed.

90 ml. of the acid silica sol of Example I was diluted to 250 ml. with deionized water. To this was added 128 ml. of the basic aluminum chloride of Example II which had been diluted to 250 ml. with deionized water. After the basic aluminum chloride and acid colloidal silica sol had been sufficiently mixed the resultant coated sol was contacted with resin. The final coated sol product had a solids content of 12%; the pH was 5.5 and the specific conductance was 5500. The coated product had a ratio of $Al_2O_3/SiO_2$ of 1.06.

*Example VIII*

By a procedure analogous to that outlined in Example II, an $Al_2O_3/SiO_2$ sol having an alumina/silica ratio of 0.4 was prepared and deionized by means of "Nalcite SAR" (in $HCO_3$ form) to a pH of 5.5. This sol was then in turn passed through a 1 x 8 inch column of acetate resin, "Nalcite SBR" (in OAC form). The pH of this eluted sol was 5.9 and the specific conductance at 77° F. was 1850. The density of the approximately 20% solids sol was 1.143.

*Example IX*

58 pounds of deionized water were mixed with 27 pounds of the basic aluminum halide of Example II which was calculated to be equivalent to 6.2 pounds of $Al_2O_3$. 93 pounds of the acid silica sol produced through the procedure of Example I (31.6 pounds of $SiO_2$) were added to the above basic aluminum halide with rapid stirring. Upon complete mixture, the pH was 3.7 and the specific conductance 17,000. This mixture was then heated for 1 hour at 180–188° F., and allowed to cool to 77° F. After this heat treatment, the pH was 2.9 and the specific conductance was 23,500. To this mixture was then gradually added 39.4 pounds of resin. The contents of the reaction vessel including the resin were emptied into a filtration unit and rinse water then applied to the resin bed. The filtered sol product weighing 190 pounds had a specific gravity of 1.145. The product was analyzed and found to contain 19.8% solids. The ratio of $Al_2O_3/SiO_2$ was 0.22. The conductance was 3250; the pH was 5.5; and the viscosity was 4.1 cps.

A portion of the above alumina-coated silica sol was concentrated by heating on a steam bath at around 200° F. with stirring. The slightly viscous solid was concentrated to a solids content of 29.5% and maintained the same $Al_2O_3/SiO_2$ ratio of 0.22. The pH was 5.0 and the specific conductance was 3900. The density of the sol was 1.227 and the viscosity was 49 cps. at 77° F. by Brookfield viscometer measurement.

The aluminum-coated silica sols obtainable according to this invention are suitable for great variety of purposes. They may be used for waterproofing building materials constructed from hydraulic binding agents or binding agents which harden in the air, as for example, concrete, cement mortar or lime mortar, or for waterproofing insulating masses, the liquid or solid sols being incorporated with the materials to be mixed or with the necessary water. The liquid sols may also be used, if desired, together with other substances, as for example, silica sol, lime water, ammonia and other substances, for waterproofing parts of buildings or building elements constructed of porous material, as for example, porous bricks, light stones, asbestos plates, cork plates or gypsum plates, or insulating masses, such as diatomite, either by coating them superficially with a film of the sols by spraying or painting, or by impregnating them with the sols. If necessary, the materials may be subsequently heated to high temperatures, as for example, from 100° C. to 400° C., or treated, for example, with ammonia water.

The sols are also suitable for the preparation of adherent, transparent, protective coatings free from cracks, on articles of all kinds. Glass plates which have been coated for example with a film of alumina gel, will withstand temperatures of 400° C. and more without the film being destroyed. Films of alumina may be applied to window panes used for display purposes and to spectacle glasses (especially in gas masks) to protect them from becoming coated in moist air (breath-proof). The sols may also be used for glazing ceramic bodies, as for example, silicon articles, the bodies being subsequently fired. When employed as a varnish on wood or tapestry, the sols impart gloss and washability. The sols, if desired with an addition of other substances, are suitable for the impregnation of wood, textiles, threads, fabrics, paper and pasteboard, whether for the purpose of rendering them waterproof, protecting them from putrefaction or reducing their combustibility. They may also be used, if desired, together with gelatin, as agents for forming or stabilizing emulsions in the preparation of petroleum, wax, oil or paraffin emulsions. The sols or the jelly particles obtained therefrom are also suitable for the preparation, for example, of concentratable thick juice from sugar beet slices, for the precipitation of floating substances in solutions, such as fats, starch, yeast albumen and gelatinous substances and also rubber raw materials, for the enrichment of enzymes, as mordants for fabrics and leather, for use in the lacquer industries, dyeworks, and in the preparation of yeast, wine and beer and as substitutes for lubricants. The sols and gels may also be employed for the refining, desulfurizing, and deodorizing of solutions, oils and hydrocarbons. They are also suitable as initial materials for the preparation of salts of organic acids, as for example, of acetic acid, formic acid, lactic acid, citric acid, tartaric acid, stearic acid, salicylic acid or pyrogallol.

The alumina-silica sols are also eminently suitable as tanning agents, being especially suitable for tawing. Contrasted with tawed leather obtained by tanning with alum, leather tanned with fine alumina sols is washable. An analogous situation exists with regard to aluminum-coated silica sols. The sols may also be employed in the preparation of colored leather.

The sols are excellent protective colloids in the preparation of sols or of difficultly precipitable suspensions of metals, metalloids, and metal compounds, as for example, sulfur suspensions of sulfur and latex. They may also be employed as agents for combating pests, preventing dry rot, preventing putrefaction, preserving eggs, impregnating tobacco to eliminate toxic components in the tobacco smoke, for preventing rust, for polishing, washing and cleaning or as additions to agents employed for these purposes. They may also be employed as coagulating agents, for example, for latex, as fillers for rubber and rubber-like substances, pasteboard and paper and for weighting silk. They constitute excellent adhesives and cements for glass, metals and ceramic masses; they are suitable as binding agents in the sizing of paper, in the preparation of silicon bricks, metal bricks, magnet cores, safety glass, in the briquetting of coke, mineral coal and the like, and in the preparation of fireproof tile.

The sols may also serve for the solidification of colloids and in the preparation of artificial composition and compressed masses of all kinds. They may also serve as masses producing the framework for the solidification of liquids, alcohols, which are brought into commerce in tubes, by mixing the liquid or solid gel (the latter after swelling) with alcohols and coagulating, if desired, by the addition of electrolytes, as for example, in the production of solid or pasty burning spirits or in the solidification of perfumes or scouring water, the tube in the latter case being provided with a filter so that merely the liquid and not the substance of the framework is pressed from the tube. Alcohols, alcogels, benzene sols, benzene gels, and other organosols and organogels may also be prepared from the sols, the initial materials being either liquid or gels. The pure sols or the gels obtainable therefrom may also be charged into tubes, as for example, for employment for medicinal purposes, and for example, as a substitute for aluminum acetate, when it is not desired to employ solid sols for that purpose. In this connection, sols which have been prepared by peptization with organic acids, as for example, acetic acid, are especially suitable. The sols may also be mixed with fats and oils, as for example, wool grease, to form salves.

The solid and liquid sols and jellies leave behind, by the addition of suitable electrolytes or by very sharp drying, as for example, at 400° C., or by drying for a long time at temperatures lower than the said temperature, dry residues which no longer dissolve in water, i.e., the so-called irreversible gels. These have a high adsorptive capacity for dissolved substances, gases and vapors and may be employed as catalysts or purifying masses, as carriers therefore for the refining of oils and hydrocarbons, as for example, benzenes, for the desulfurization of gases and liquids, for the purification and clarification, as well as the desulfurization and dechlorination of water, furthermore as base exchange bodies or as carriers therefore. Compact or porous carrier substances, as for example, glass beads, bauxite, active alumina, silica gel, pumice, clay or base-exchange substances, which have been superficially coated with a film of the alumina-coated silica sol, or which have been impregnated therewith, the film, if desired, being rendered insoluble by the action of electrolytes or by sharp heating, may also be employed for the same purposes. The sols are also suitable as binding agents in shaping bleaching earths, active substances, as for example, active carbon, gels, base-exchange substances, and catalysts or as the initial materials for catalysts or desulfurating masses, as for example, so-called red sludge, by grinding the said substances in a ball mill together with the sols and a suitable amount of water, shaping the mass, drying and activating by heating, a washing process being interposed, if desired.

The expression "weak acid" as used herein refers to an acid having a very low degree of ionization in water. For example at room temperature (20° C.) the first ionization constant of hydrosulfurous acid ($H_2S$) is $9 \times 10^{-8}$; the second ionization constant $7 \times 10^{-11}$. The ionization constant of hydrocyanic acid (HCN) is $2.1 \times 10^{-9}$. The ionization constant of nitrous acid ($HNO_2$) is $4.5 \times 10^{-4}$. (See Qualitative Analysis by Pierce and Haenisch, 2nd edition (1944), page 427.)

In general, the anions of the anion exchange resins employed for the purpose of the invention are anions of acids having ionization constants not greater than $4.5 \times 10^{-4}$. The anion corresponding to hydrosulfurous acid is $SH^-$. The carbonate anion is $CO_3^=$. The bicarbonate anion is $HCO_3^-$. The anion of hydrocyanic acid is $CN^-$. The anion of nitrous acid is $NO_2^-$.

The term "halide" as used herein refers to the metal chlorides, bromides and iodides. In most cases, however, the metal chlorides are used as starting materials because they are more readily available and are also sufficiently soluble or hydrolyzable in water for the preparation of the alumina-coated silica sols which are brought into contact with the anion exchange resin.

The term "salt-free colloidal silica sol" is used to designate the silica particles of the silica sol which have been deionized so that the system is substantially salt-free, that is, having a salt content expressed as $Na_2SO_4$ of less than 0.001%.

By the process term "single pass" is meant a single one-step, contact step of anion exchange resin with the partially reacted mixture of silica sol and basic aluminum halide through any known technique such as slurry of resin in the mixture or passage of the mixture through a body or column of resin.

The term "alumina-coated silica sol" as used herein refers to a sol in which the collodial silica particles are completely and uniformaly coated with at least one or more layers of alumina.

The above sol products are simply prepared through the essential steps of the invention involving only the mixing of the basic aluminum halide with a silica sol followed by a single resin contact. Heating may be effected if so desired but suitable products may be prepared in the absence of this process variant. This process represents an advance in the art particularly since products of this type, falling within the above defined pH range, either could not heretofore be prepared or were prepared only through relatively cumbersome and complex process involving substantially more distinct and separate steps.

What is claimed is as follows:

1. A method of producing a stable, aqueous, alumina-coated silica sol which comprises the steps of mixing an aqueous, substantially salt-free acid silica sol containing from 3 to 50% by weight of non-agglomerated, discrete particles of silica as the dispersed phase, with sufficient basic aluminum halide to uniformly coat said silica particles with alumina, to yield a coated sol product having an $Al_2O_3/SiO_2$ ratio ranging from 0.1 to 1.0; and finally contacting said coated sol product in a single pass with a water-insoluble anion exchange resin which has as its exchangeable anion an anion of a weak volatile inorganic acid to produce a stable, substantially salt-free alumina-coated silica sol having a pH ranging from 4.5 to 6.5.

2. The method of claim 1 wherein said salt-free acid silica sol contains from 3 to 30% by weight of silica, said basic aluminum halide is added in an amount sufficient to yield a coated sol product having an $Al_2O_3/SiO_2$ ratio ranging from 0.1 to 0.6, and said alumina-coated silica sol contains from 5 to 40% by weight of solids.

3. The method of claim 2 wherein the basic aluminum halide is $(Al_2(OH)_5Cl)_x$ and $x$ is an integer ranging from 1 to 5.

4. The method of claim 1 wherein said anion exchange resin is a strongly basic anion exchanger which is the reaction product of (1) a benzene-soluble copolymer containing in chemically combined form 0.5% to 40% by weight of a polyvinyl-aromatic hydrocarbon and from 99.5% to 60% of a monovinyl-aromatic compound of the class consisting of a monovinyl-aromatic hydrocarbons having the vinyl radical directly attached to a carbon atom of the aromatic nucleus and nuclear halogenated derivatives thereof, which copolymer contains an average of from 0.2 to 1.2 halomethyl groups per aromatic nucleus in the copolymer, with (2) a tertiary amine selected from the group consisting of tertiary mono- and di-alkyl N-substituted alkanol and alkanediol amines, in an amount such that there is present in the reaction mixture at least one mol of the tertiary amine for each halomethyl group in the copolymer, said anion exchanger being in the bicarbonate form.

5. A method of producing a stable, aqueous, alumina-coated silica sol which comprises the steps of mixing an aqueous, substantially salt-free acid silica sol containing from 3 to 50% by weight of non-agglomerated, discrete particles of silica as the dispersed phase with sufficient basic aluminum halide to uniformly coat said silica particles with alumina to yield a coated sol product having an $Al_2O_3/SiO_2$ ratio ranging from 0.1 to 1.0, heating said sol product from about 180° F. to about the boiling point of water to more firmly fix said alumina on said silica particles; and finally contacting said sol product in a single pass with a water-insoluble anion exchange resin which has as its exchangeable anion an anion of a weak volatile inorganic acid to produce a stable, substantially salt-free alumina-coated silica sol having a pH ranging from 4.5 to 6.5.

6. The method of claim 5 wherein said salt-free silica sol contains from 3 to 30% by weight of silica, said basic aluminum halide is $(Al_2(OH)_5Cl)_x$ where $x$ is an integer ranging from 1 to 5, which halide is added in an amount sufficient to yield a coated sol product having an $Al_2O_3/SiO_2$ ratio ranging from 0.1 to 0.6 and said alumina-coated sol contains from 5 to 40% by weight of solids.

7. The method of claim 6 wherein said anion exchange resin is a strongly basic anion exchanger which is the reaction product of (1) a benzene-insoluble copolymer containing in chemically combined form from 0.5 to 40% by weight of a polyvinyl-aromatic hydrocarbon and from 99.5% to 60% of a monovinyl-aromatic compound of the class consisting of monovinyl-aromatic hydrocarbons having the vinyl radical directly attached to a carbon atom of the aromatic nucleus and nuclear halogenated derivatives thereof, which copolymer contains an average of from 0.2 to 1.2 halomethyl groups per aromatic nucleus in the copolymer, with (2) a tertiary amine selected from the group consisting of the tertiary mono- and di-alkyl N-substituted alkanol and alkane-diol amines, in an amount such that there is present in the reaction mixture at least one mol of the tertiary amines for each halomethyl group in the copolymer, said anion exchanger being in the bicarbonate form.

8. A method of producing a stable, aqueous alumina-coated silica sol which comprises the steps of mixing an aqueous salt-free acid silica sol having a pH ranging from 2.6 to 3.8, a specific electrical conductivity less than 1000 micromhos/cm. measured at 77° F., and from 3–30% by weight of non-agglomerated discrete particles of silica as the dispersed phase, with sufficient basic aluminum halide to uniformly coat said silica particles with alumina to yield a coated sol product having an $Al_2O_3/SiO_2$ ratio ranging from 0.1 to 0.6; and finally contacting said coated sol product in a single pass with a water-insoluble anion exchange resin which has as its exchangeable anion and anion of a weak volatile inorganic acid to produce a stable, substantially salt-free alumina-coated silica sol having a pH from 4.5 to 6.5 and a solids content ranging from 5 to 40% by weight.

9. The method of claim 8 wherein said anion exchange resin is a strongly basic anion exchanger which is the reaction product of (1) a benzene-soluble copolymer containing in chemically combined form from 0.5% to 40% by weight of a polyvinyl-aromatic hydrocarbon and from 99.5% to 60% of a monovinyl-aromatic compound of the class consisting of monovinyl-aromatic hydrocarbons having the vinyl radical directly attached to a carbon atom of the aromatic nucleus and nuclear halogenated derivatives thereof, which copolymer contains an average of from 0.2 to 1.2 halomethyl groups per aromatic nucleus in the copolymer with (2) a tertiary amine selected from the group consisting of the tertiary mono- and di-alkyl N-substituted alkanol and alkanediol amines, in an amount such that there is present in the reaction mixture at least one mol of the tertiary amines for each halomethyl group in the copolymer, said anion exchanger being in the bicarbonate form.

10. The method of claim 9 wherein said coated sol product is heated before contact with said anion exchange resin, at temperatures ranging from 180° F. to about the boiling point of water in order to more firmly fix said alumina upon said silica.

11. The method of claim 9 wherein said salt-free alumina-coated silica sol is heated from 180° F. to about the boiling point of water to remove the excess volatile gas contained therein.

References Cited by the Examiner
UNITED STATES PATENTS

| | | | |
|---|---|---|---|
| 2,733,205 | 1/1956 | Dalton et al. | 252—313 XR |
| 2,892,797 | 6/1959 | Alexander et al. | 252—313 |
| 3,007,878 | 11/1961 | Alexander et al. | 252—313 |

JULIUS GREENWALD, *Primary Examiner.*